US011145218B2

(12) United States Patent
Richardson et al.

(10) Patent No.: US 11,145,218 B2
(45) Date of Patent: Oct. 12, 2021

(54) SPRAY PAINT SIMULATOR AND TRAINING AID

(71) Applicant: Envision Technologies, LLC, Orlando, FL (US)

(72) Inventors: Wesley Richardson, Jackson, TN (US); Jameson Richardson, Jackson, TN (US); Joseph Richardson, Jackson, TN (US); John Barrett Gay, Nashville, TN (US); Quincy Phelps Jones, Nashville, TN (US)

(73) Assignee: Envision Technologies, LLC, Orlando, FL (US)

( * ) Notice: Subject to any disclaimer, the term of this patent is extended or adjusted under 35 U.S.C. 154(b) by 0 days.

(21) Appl. No.: 17/130,352

(22) Filed: Dec. 22, 2020

(65) Prior Publication Data

US 2021/0150930 A1 May 20, 2021

Related U.S. Application Data

(63) Continuation of application No. 15/888,255, filed on Feb. 5, 2018, now Pat. No. 10,909,876.

(51) Int. Cl.
*G09B 11/10* (2006.01)
*G09B 9/00* (2006.01)
(Continued)

(52) U.S. Cl.
CPC .............. *G09B 11/10* (2013.01); *G06F 3/011* (2013.01); *G06T 13/20* (2013.01); *G09B 9/00* (2013.01); *G09B 19/24* (2013.01); *G06T 2210/24* (2013.01)

(58) Field of Classification Search
CPC ...................................................... G09B 11/10
(Continued)

(56) References Cited

U.S. PATENT DOCUMENTS 5,951,296 A 9/1999 Klein
7,106,343 B1 9/2006 Hickman
(Continued)

FOREIGN PATENT DOCUMENTS

EP 2178010 10/2008

OTHER PUBLICATIONS

Improved Spray Paint Thickness Calculation from Simulated Droplets Using Density Estimation, Tafuri et al., Proceedings of the ASME 2012 International Design Engineering Technical Conferences & Computers and Information in Engineering Conference IDETC/CIE 2012, Aug. 12-15, 2012 (Year: 2012).*
(Continued)

*Primary Examiner* — Jerry-Daryl Fletcher
*Assistant Examiner* — Jennifer L Korb
(74) *Attorney, Agent, or Firm* — Maskell Law PLLC; Benjamin E. Maskell (57) ABSTRACT

Disclosed is a method for simulating the accumulation of paint on a virtual object, the method comprising, dividing a surface of the virtual object into a plurality of sections, determining a point on the virtual object to deposit a virtual paint droplet, depositing the virtual paint droplet on the virtual object so that a center of the virtual paint droplet is disposed at the point, determining a subset of the plurality of sections touching the virtual paint droplet, calculating a thickness for the virtual paint droplet based on a volume and a radius of the virtual paint droplet, and incrementing each of the subset of the plurality of sections by the calculated thickness of the virtual paint droplet.

14 Claims, 9 Drawing Sheets

(51) Int. Cl.
    *G06F 3/01*          (2006.01)
    *G06T 13/20*        (2011.01)
    *G09B 19/24*        (2006.01)

(58) Field of Classification Search
    USPC .............................................. 434/84; 345/592
    See application file for complete search history.

(56) References Cited

U.S. PATENT DOCUMENTS

| | | |
|---|---|---|
| 7,817,162 B2 | 10/2010 | Bolick |
| 7,839,416 B2 | 11/2010 | Ebensberger |
| 7,839,417 B2 | 11/2010 | Ebensberger |
| 9,384,675 B2 * | 7/2016 | Zboray ................... G06F 3/011 |
| 2004/0189284 A1 | 9/2004 | Haubold |
| 2009/0083015 A1 | 3/2009 | McDaniel |
| 2019/0347865 A1 | 11/2019 | Hackett |

OTHER PUBLICATIONS

"Application, Rendering and Display of Automotive Paint," J. Konieczny, Dept. of Computer and Information Science, University of Minnesota, Nov. 2009 (Year: 2009).*

"Modeling of Spraying with Time-Dependent Material Feed Rate," D. Stepanenko, Applied Mathematical Modeling, vol. 31, pp. 2564-2576, Nov. 29, 2006 (Year: 2006).

* cited by examiner

| SIMULATION PROFILE | [800] |
|---|---|
| Droplets Per Frame: 5,000 | [810] |
| Droplet Radius: 1 cm | [815] |
| Refresh Rate: 90 hz | [820] |
| Optimal Distance: 22 cm | [830] |
| Distance Threshold: +/- 4 cm | [840] |
| Maximum Distance: 30 cm | [850] |
| Optimal Speed: 0.3 m/s | [860] |
| Speed Threshold: +/- .02 m/s | [870] |
| Air Pressure: 15 PSI | [880] |
| Paint Volume: 700 ml | [890] |

| SPRAYER PROFILE | [600] |
|---|---|
| Nozzle Name: 1.4mm | [610] |
| Nozzle ID: 1 | [620] |
| Dispersion Pattern: ⬭ | [630] |
| Max Flow at 15 PSI: 3.7 L/Min | [640] |

| PAINT PROFILE | [700] |
|---|---|
| Paint Name: 3M Red 134 (2013 Honda CRV) | [710] |
| Specific Gravity: 1.2 g/L | [720] |
| Solids by Weight: 20% | [730] |
| Solids by Volume: 18% | [740] |
| Optimal Thickness: 0.8mm | [750] |

SPRAY PAINT SIMULATOR AND TRAINING AID

This application is a continuation of U.S. patent application Ser. No. 15/888,255 filed Feb. 5, 2018 the entirety of which is hereby incorporated by reference.

BACKGROUND OF THE INVENTION

Field of the Invention

The embodiments of the invention relate to training aids, and more particularly, to a virtual reality training aid for paint sprayers. Although embodiments of the invention are suitable for a wide scope of applications, it is particularly suitable for providing a virtual environment in which technicians can learn to use a paint sprayer without using real paint.

Discussion of the Related Art

Spray painting relates to aerosolizing specially manufactured paints. Spray painting can be useful for painting large surfaces and for quickly applying an even coat of paint to an object. Spray painting is ubiquitous in the field of vehicle parts where car doors, hoods, and other parts can be rapidly and quickly painted using spray paint. Tools associated with spray painting include a paint sprayer, an air supply, and a paint supply. The paint sprayer has a trigger and, upon pulling the trigger, the paint sprayer can combine paint and air to provide a mist or spray of paint from its nozzle. Operating the spray gun is deceptively simple and includes primarily pointing and pulling the trigger. The art of spray painting, however, is incredibly difficult and require extensive training and experience to quickly apply a smooth, even-thickness, non-dripping coat of paint to an object. Thus, training is an integral part of operating a paint sprayer and is important for satisfactory results.

Current methods of training paint sprayer operators include training classes with physical hardware and an environment that is identical or substantially similar to hardware that would be used in a commercial facility. The hardware and environment can include a paint booth, an air compressor, a paint sprayer, a ventilation system, paint, and an object to paint. While training that mimics a commercial environment is excellent training, such training methods are expensive because of the equipment and facilities needed. Additionally, training according to traditional methods uses consumables such as paint and objects to paint. Paint for spray painting and, in particular, paint suitable for spray painting car parts can be comparatively expensive to other types of paints thereby contributing to overall cost of providing training.

Others have contemplated a virtual-reality training aid, including that described in U.S. Pat. No. 7,839,416 of Ebensberger et. al. ("Ebensberger") and its related applications. Ebensberger discloses a method for calculating the accumulation of virtual paint on a virtual object. At the heart of the Ebensberger disclosure is a paint model that assumes that simulating a paint sprayer includes the calculation of two, concentric ellipses. See, e.g. Ebensberger, FIG. 10. According to Ebensberger, paint is assumed to accumulate evenly within an inner ellipse. Between the inner ellipse and the outer ellipse the accumulation of paint is assumed to drop off linearly. Finally, no paint is assumed to accumulate outside the outer ellipse. Ebensberger discloses that a paint sprayer for use in the Ebensberger system should include a six-axis sensor and corresponding processor so that the ellipse can rotated and skewed appropriately for projected on a virtual surface.

There are many drawbacks, however, to the Ebensberger system. First, the two-ellipse paint model of Ebensberger is primitive and may not sufficiently simulate the accumulation of paint on a virtual surface. Second, the paint sprayer of the Ebensberger includes specialized hardware that can increase the cost of the Ebensberger paint sprayer and require variations from the look and feel of commercial paint sprayers.

Thus, it is apparent that improvements are needed to the related art spray paint training aids. Traditional hands-on training with real paint requires large and expensive equipment and relies heavily on expensive one-time-use supplies (e.g. paint). Existing virtual training systems are rudimentary, rely on specialized equipment, and do not sufficiently simulate spray painting to be a valuable training aid.

SUMMARY OF THE INVENTION

Accordingly, embodiments of the invention are directed to a spray paint simulator and training aid that substantially obviates one or more of the problems due to limitations and disadvantages of the related art.

An object of embodiments of the invention is to provide an improved spray paint training aid.

Another object of embodiments of the invention is to provide a spray paint training aid that does not require consumables such as paint.

Yet another object of embodiments of the invention is to provide a spray paint training aid that accurately models commercial spray painting.

Still another object of embodiments of the invention is to provide a spray paint training aid that substantially utilizes off-the-shelf components.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a spray paint simulator and training aid includes a mock paint sprayer, a trigger sensor of the mock paint sprayer, a head-mounted display unit, a motion tracking system for tracking a position and an orientation of the mock paint sprayer and the head-mounted display unit, a computer running software operable to display a virtual object and a virtual paint sprayer on the head-mounted display and, in response to an input from the trigger sensor, simulate the accumulation of paint on the virtual object, wherein the simulating the accumulation of paint includes generating a plurality of vectors extending between the virtual paint sprayer and the virtual object within a dispersion pattern.

In another aspect, a spray paint simulator and training aid includes a mock paint sprayer, a trigger sensor of the mock paint sprayer, a head-mounted display unit, a motion tracking system for tracking a position and an orientation of the mock paint sprayer and the headset, a computer running software operable to display a virtual object on the head-mounted display and, in response to an input from the trigger sensor, simulate the accumulation of paint on the virtual object, a plurality of virtual paint droplets, each of the plurality of droplets having a radius and a thickness, a plurality of vectors, each respectively associated with one of the plurality of virtual paint droplets and having a length extending from the mock paint sprayer to the virtual object, a maximum distance threshold, a mesh data structure corresponding to the virtual surface, the mesh data structure for storing the virtual droplets, wherein the accumulation of paint on the virtual object is simulated by calculating, for each of the plurality of vectors having a length less than the maximum distance threshold, an intersection point with the virtual surface, and storing the corresponding virtual paint droplets of the plurality of vectors in the mesh consistent with the intersection point.

In yet another aspect, a spray paint simulator and training aid includes a mock paint sprayer, a trigger sensor of the mock paint sprayer, a head-mounted display unit, a motion tracking system for tracking the mock paint sprayer and the headset, a computer running software operable to display a virtual object on the head-mounted display and, in response to an input from the trigger sensor, simulate the accumulation of paint on the virtual object, an arrow displayed on the head-mounted display, the arrow responsive to one of the position or orientation of mock paint sprayer with respect to the virtual object.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 1:
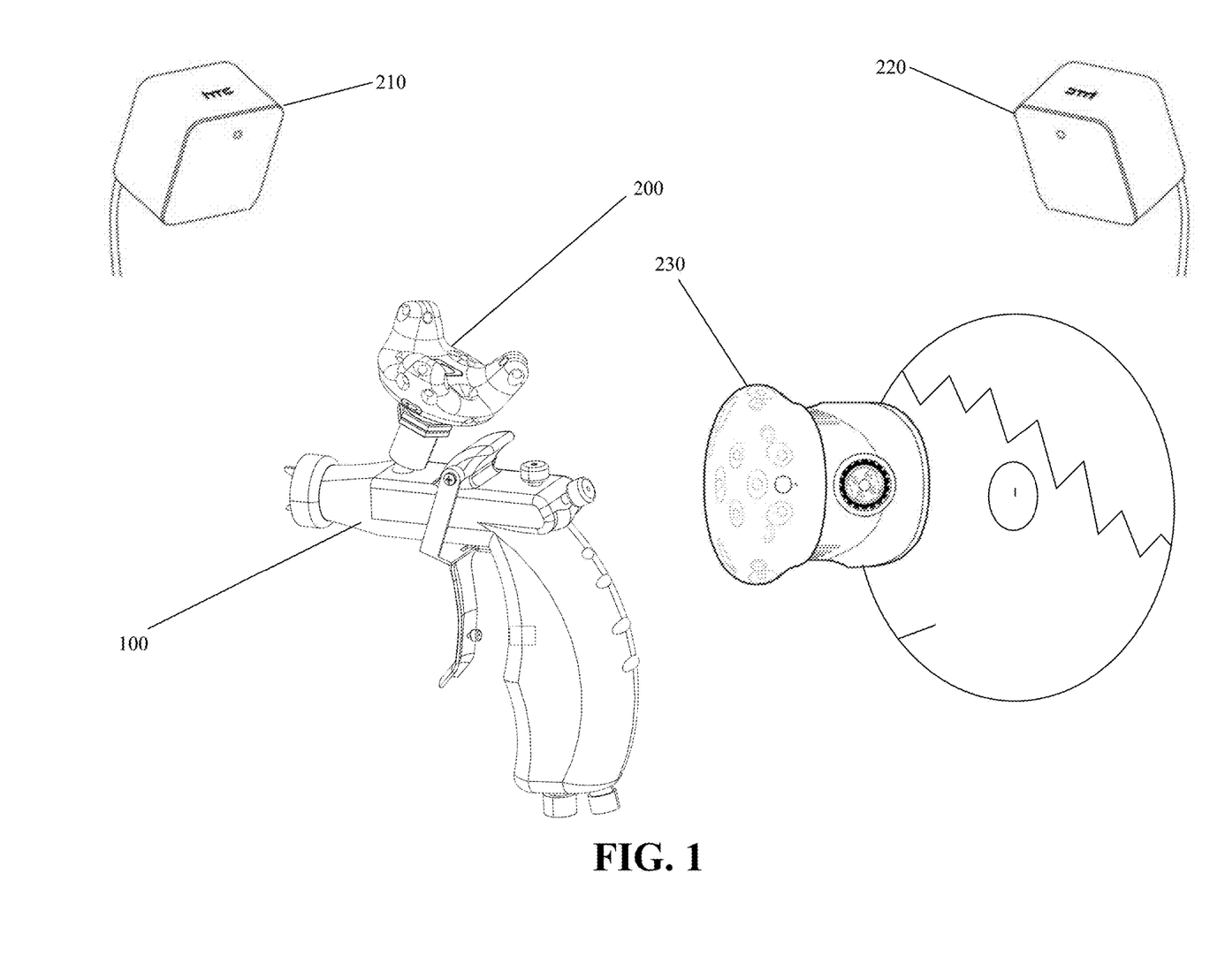
FIG. 1 is a system drawing of a paint simulator and training aid according to an exemplary embodiment of the invention.

FIG. 1 is a system drawing of a paint simulator and training aid according to an exemplary embodiment of the invention. As shown in FIG. 1, a paint simulator and training aid includes a mock paint sprayer 100, a reference object 200, trackers 210 and 220, and a head-mounted display 230.

The mock paint sprayer 100 can be a real paint sprayer that is modified for use with the invention. The mock paint sprayer 100 can be, for example, a 3M ACCUSPRAY ONE spray gun, a 3M ACCUSPRAY HGP spray gun, or other off-the-shelf paint sprayer. By using an off-the-shelf paint sprayer, the mock paint sprayer 100 can simulate the weight and feel of a real paint sprayer.

The mock paint sprayer 100 can include a reference object 200 where a paint reservoir of a paint sprayer would normally be located. Trackers 210 and 220 can include cameras that, in combination with a computer and processor running tracking software stored in a memory of the computer, track the location of the reference object 200. Trackers 210 and 220 can further track the location of the head-mounted display 230. The tracking information from the trackers 210 and 220 can be used to position a virtual paint sprayer in a virtual environment shown on the head-mounted display.

In embodiments of the invention the reference object 200, the trackers 210 and 220, and the head-mounted display 230 are part of HTC's VIVE VR System. Software to track the reference object 200 and the head-mounted display 230 can be provided by HTC's VIVE VR System ("tracker software") and run on standard off-the-shelf computing hardware.

Embodiments of the invention can include simulation software to interface with the tracker software and receive the relative positions of the reference object 200 and the head-mounted display 230. The simulation software can create an image of a virtual environment including a virtual paint sprayer to be displayed on the head-mounted display 230. The virtual paint sprayer in the virtual environment can correspond in relative position to the mock paint sprayer 100 in the real world. The point of view or perspective of the image of the virtual environment can correspond to the position of the head-mounted display 230. Thus, a user wearing the head-mounted display can be presented with an image of a virtual paint sprayer that corresponds to the actual position of the mock paint sprayer 100. The image of the virtual environment including the virtual paint sprayer can update frequently with new relative positions of the mock paint sprayer 100 and the head-mounted display 230 to provide the impression of a live video feed. In preferred embodiments of the invention, new images are presented ninety times per second or, in other words, the head-mounted display 230 can have a refresh rate of 90 hz.

Figure 2:
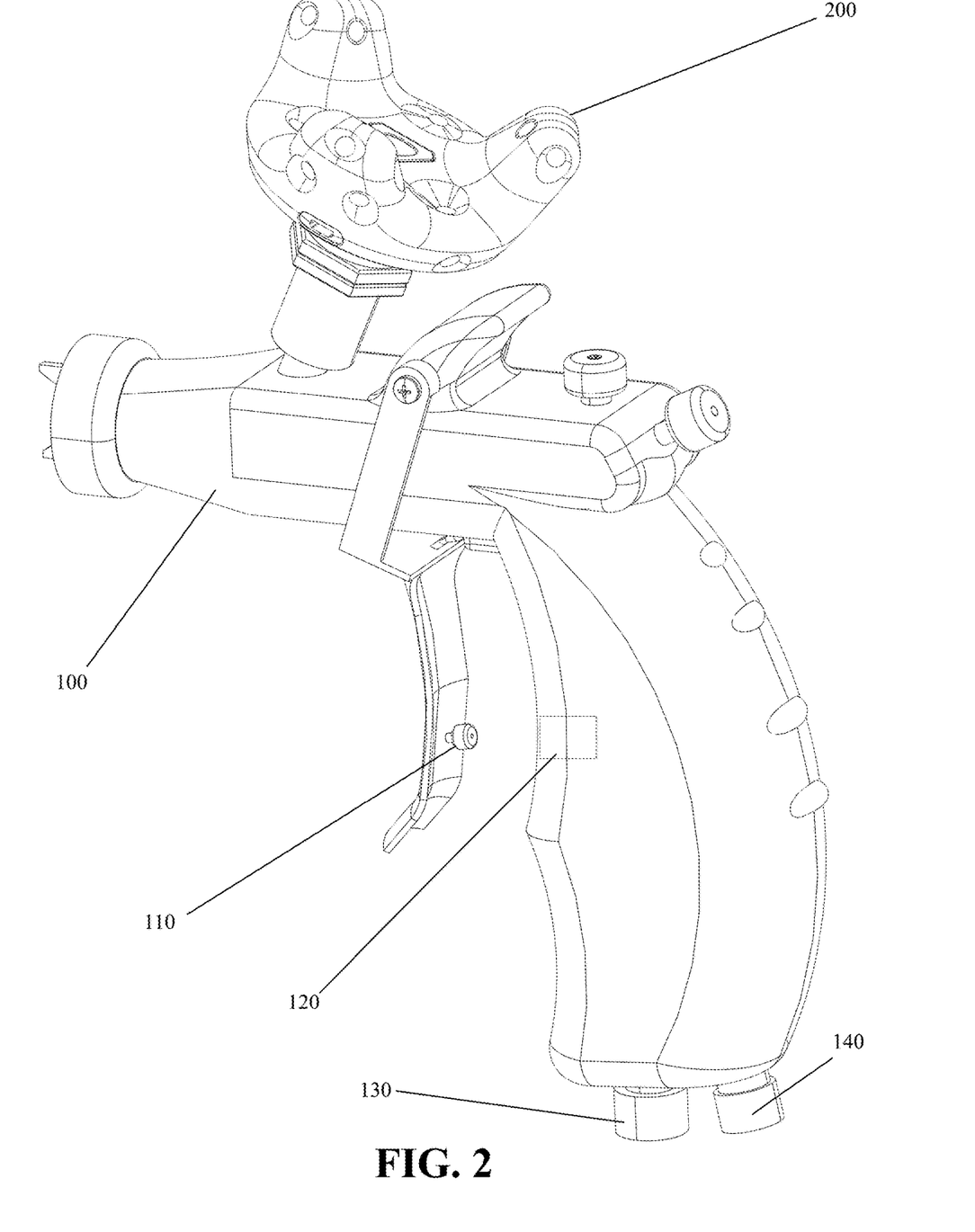
FIG. 2 is an isometric drawing of a paint sprayer for a paint simulator and training aid according to an exemplary embodiment of the invention.

FIG. 2 is an isometric drawing of a paint sprayer for a paint simulator and training aid according to an exemplary embodiment of the invention. As shown in FIG. 2 a paint sprayer 100 can include a magnet 110, a Hall effect sensor 120, and input ports 130 and 140. The paint sprayer can include a reference object 200.

The magnet 110 can be attached to or embedded in a trigger portion of the paint sprayer 100. The magnet 110 can correspond in relative position to the Hall effect sensor 120 such that the Hall effect sensor 120 can detect a magnetic field of the magnet 110. When the magnet 110 is far from the Hall effect sensor 120, the magnetic field detected by the Hall effect sensor 120 can be low and can indicate that the trigger is not depressed. When the magnet 110 is close to the Hall effect sensor 120, the magnetic field detected by the Hall effect sensor 120 can be high and can indicate that the trigger is depressed. The magnetic field detected by the Hall effect sensor 120 can vary with respect to the distance between the Hall effect sensor 120 and the magnet 110 and provide an indicate of the degree to which the trigger is depressed. This information can be used by the simulation software to calculate a trigger position and virtual paint flow rate.

Paint flow rates of the invention can correspond, generally, to paint flow rates of a real paint sprayer with real paint and an active air supply. Actual paint flow rates from a real paint sprayer can be measured in relation to trigger position and stored in a table. Embodiments of the invention can determine paint flow rate based on trigger position by accessing the table. Paint flow rates can be interpolated from the table.

The trigger of the paint sprayer 100 can simulate the trigger of a real paint sprayer. In embodiments of the invention, a partial trigger pull has no effect and causes no air and no paint to be emitted. A slightly greater trigger pull can cause air to be emitted from the nozzle. In embodiments of the invention that are connected to an actual air supply, real air can be emitted from the nozzle. In other embodiments, the paint sprayer 100 can have haptic feedback such as a weight (not shown) that moves to simulate slight back pressure from air emitted by the nozzle. Still a greater trigger pull can begin the flow of virtual paint at a low amount. A full trigger pull can cause air and paint to flow at a maximum rate.

Input port 130 can correspond to an adjustment screw on a real paint sprayer. In embodiments of the invention this adjustment screw can be removed and repurposed for the connection of data lines and power for the inventive paint sprayer 100. The paint sprayer 100 can include an electronics package (not shown) to interpret signals from the hall effect sensor and communicate them through the port 130. Although the input port 130 is depicted in FIG. 2 as corresponding to the location of an adjustment screw, different locations and configurations of the input port 130 is contemplated by the invention. Input port 140 can correspond to an air input port of a real paint sprayer. In embodiments of the invention, a real air hose can be connected to input port 140 to simulate the weight and balance of a real paint sprayer connected to an air supply.

The reference object 200 can be mounted on the paint sprayer 100. As shown in FIG. 2 the tracker module is advantageously located on a top of the paint sprayer 100. The reference object 200 can attach to the paint sprayer 100 where a paint supply canister would normally attach to a real paint sprayer. The top of the paint sprayer 100 is a preferred location for the reference object 200 so that the reference object 200 can be seen by the trackers 210 and 220 (FIG. 1). In other embodiments of the invention, a paint sprayer 100 has a bottom-mounted paint supply and the reference object 200 is attached below the paint sprayer 100 in front of the trigger.

Figure 3:
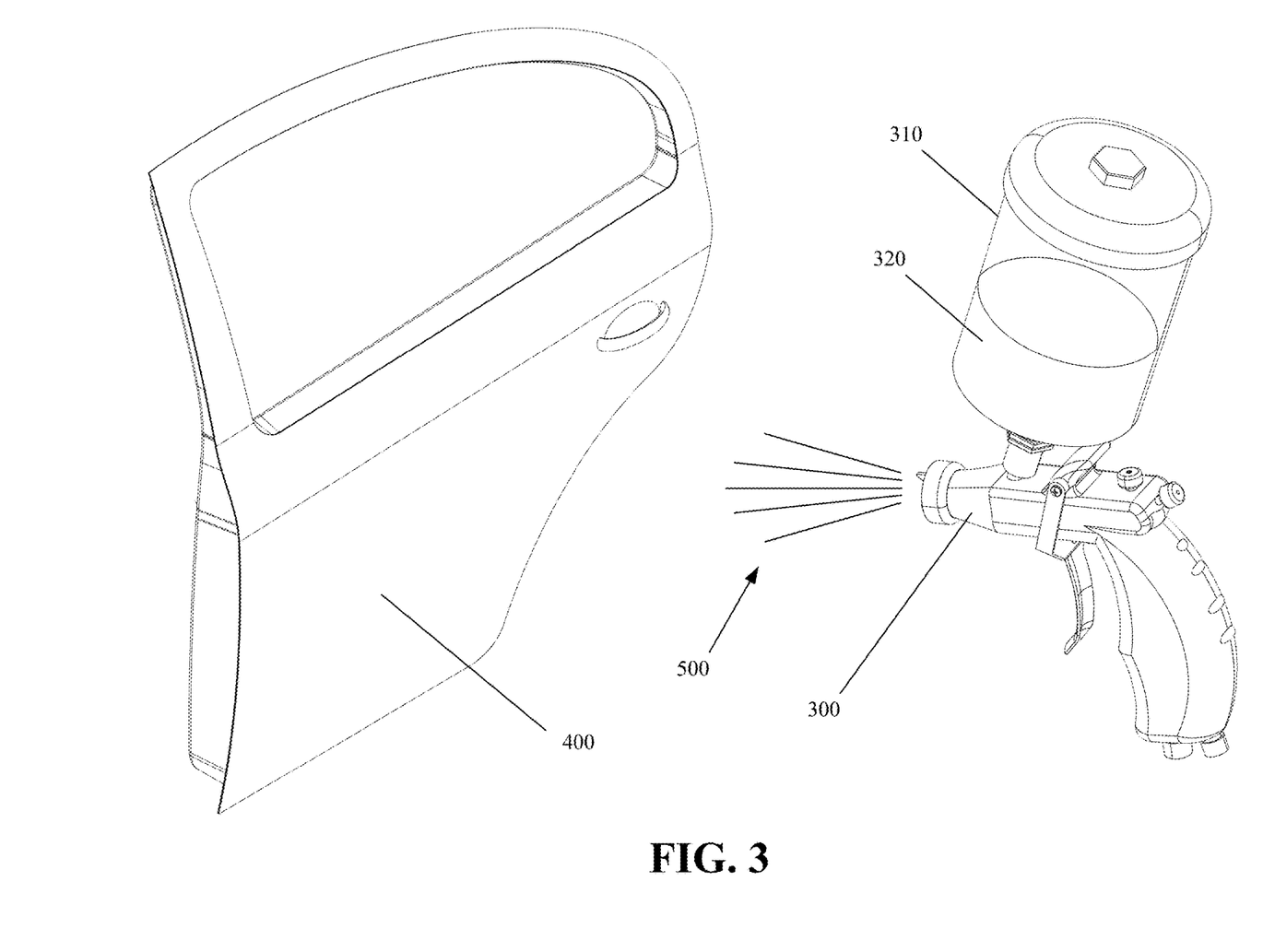
FIG. 3 is an exemplary virtual environment in a paint simulator and training aid according to an exemplary embodiment of the invention.

FIG. 3 is an exemplary virtual environment in a paint simulator and training aid according to an exemplary embodiment of the invention. As shown in FIG. 3, a virtual environment includes a virtual paint sprayer 300, a virtual work 400, and virtual paint spray 500. The virtual paint sprayer 300 can include a virtual paint cannister 310 and virtual paint 320. The virtual environment of FIG. 3 can be displayed on the screen of the head mounted display 230 of FIG. 1. The environment can be described as virtual because the items shown do not exist in the real world. It can be noted that the virtual paint sprayer 300 resembles the real paint sprayer 100 (FIG. 2) but, in the virtual environment, has the paint cannister 310 substituted in place of the reference object 200 (FIG. 2).

The virtual work 400 can be a virtual car door. The virtual work 400 can represent a training object to be painted by user of the inventive system. Although a virtual work 400 is shown and described as a door, the invention is not limited to doors and it is contemplated that the virtual work 400 can be substituted with any object to be painted.

The virtual paint cannister 310 can be shown in the virtual environment of FIG. 3 to be transparent so that a user of the inventive system can see how much paint 320 is remaining. The level of the virtual paint 320 in the virtual cannister 310 can be initially set by a simulation profile. The level of the virtual paint 320 in the virtual cannister 310 can slowly decrease as paint is used.

Virtual paint spray 500 can be emitted from the front of the virtual paint sprayer 300 in response to the trigger position. The paint flow and the paint dispersion of the virtual paint spray 500 can simulate a real paint sprayer. The virtual paint spray 500 can accumulate on the virtual work 400.

Figure 4:
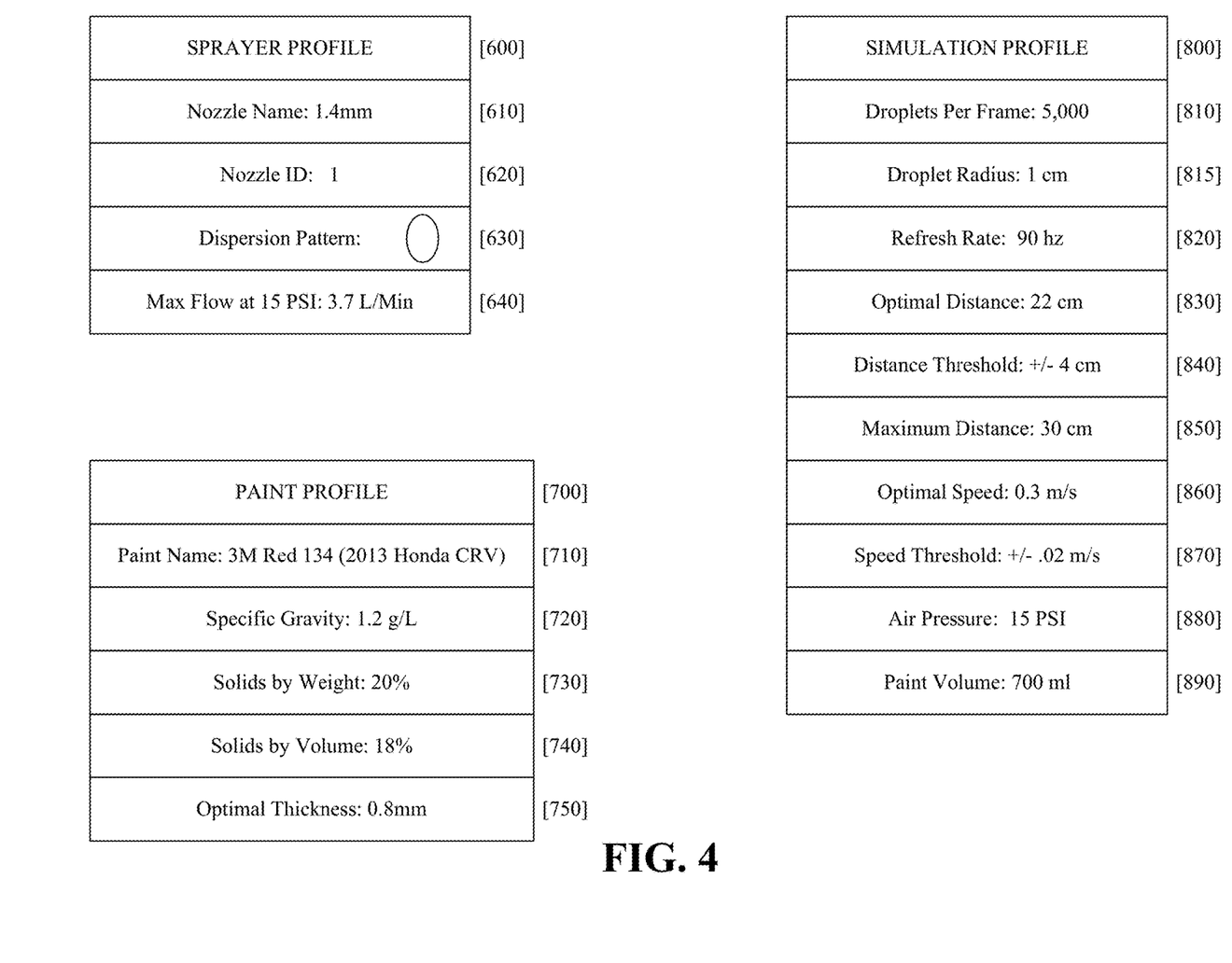
FIG. 4 is a sprayer profile, a simulation profile, and a paint profile for use in a paint simulator and training aid according to an exemplary embodiment of the invention.

FIG. 4 is a sprayer profile, a simulation profile, and a paint profile for use in a paint simulator and training aid according to an exemplary embodiment of the invention. As shown in FIG. 4 a sprayer profile 600 can include a nozzle name 610, a nozzle ID 620, a dispersion pattern 630 and a flow rate 640. A paint profile 700 can include a paint name 710, a specific gravity 720, a percentage solids by weight 730, a percentage solids by volume 740, and an optimal thickness 750. A simulation profile 800 can include a droplets per frame 810, a droplet radius 815, refresh rate 820, an optimal distance 830, a distance threshold 840, a maximum distance 850, an optimal speed 860, a speed threshold 870, an air pressure 880, and a paint volume 890.

A sprayer profile 600 can include information about a virtual paint sprayer that can be used in calculating the dispersion of paint from a virtual paint sprayer. A nozzle name 610 can be a text string that includes descriptive text about the type of nozzle being simulated. In the example of FIG. 4, the nozzle name 610 is "1.4 mm" indicating that the nozzle simulated a 1.4 mm nozzle. The nozzle ID 620 can be a unique identifier associated with other properties of the sprayer profile such as the nozzle name 610, the dispersion pattern 630, and the max flow rate 640. The dispersion pattern 630 can represent the shape of the spray. Although this is depicted as an oval in FIG. 4 for illustrative purposes, it should be appreciated that the dispersion pattern is preferably represented by an equation such as the equation for an ellipse.

The max flow 640 can represent a paint flow rate at a given pressure. In preferred embodiments of the invention the simulation software can provide a user interface for a user to select a sprayer profile 600 and optionally configure the elements 610-640 of the sprayer profile 600. In other embodiments of the invention, the sprayer profile includes a table (not shown) that correlates flow rates with pressures.

The pressure 880 can be provided by the simulation profile 800 and the flow rate can be referenced from the table.

A paint profile 700 can include information about a virtual paint selected by a user. The paint name 710 can be text string that describes the paint. In preferred embodiments the simulation software can include a user interface where a user can select a paint profile based on a paint name. The specific gravity 720 can represent a specific gravity of the virtual paint. The percentage of solids by weight 730 can represent the percent of solids in the virtual paint per unit weight. The percentage of solids by volume 740 can represent the percentage of solids in the virtual paint by unit volume. Collectively the specific gravity 720, and the percentages 730 and 740, can be used to calculate the accumulation of paint on a virtual surface. The optimal thickness 750 can represent an optimal thickness of virtual paint on an object. If the thickness is less than the optimal thickness, the coverage can be too thin and the paint might chip easily or expose the substrate. If the coverage is too thick, paint is wasted. A paint profile preferably includes this optimal thickness value 750 and embodiments of the invention can compare the actual thickness of virtual paint on a virtual surface against the optimal thickness 750 of the paint profile 700. The specific values of the paint profile can be provided by a paint manufacturer. A user can optionally adjust these values to the extent actual specifications vary from a saved paint profile.

The simulation profile 800 can include session variable information about the current virtual paint session. The droplets per frame 810 can represent the number of paint droplets to be projected from the sprayer nozzle in each frame. A frame can refer to a video frame displayed on the head-mounted display unit of FIG. 1. Preferably, the head-mounted display unit has a refresh rate 820 of 90 hz (i.e. displays 90 frames per second). When the droplets per from 810 is 5000, and the refresh rate 820 is 90 hz, the 5000×90 paint droplets can be projected onto a virtual surface per second. The droplet radius 815 can represent a predetermined value for a droplet of paint on virtual surface. In embodiments of the invention, each droplet can be assumed to be equal and thus a single radius 815 can adequately describe all droplets.

The optimal distance 830 can represent a preferred distance between the front of the virtual paint sprayer and the virtual work. When the actual distance is greater than the optimal distance 830, the paint can be diffuse and sometimes the virtual paint droplets will not reach the virtual work resulting in waste. When the actual distance is less than the optimal distance 830, the paint can be too thick resulting in running and streaking. The optimal distance 830 can be a static value, a user-entered value, or can be selected in accordance with the sprayer profile 600, the paint profile, and air pressure 880. The distance threshold 840 can represent a reasonable margin of error from the optimal distance 830.

The optimal speed 860 can represent an optimal linear speed at which an operator should move the paint sprayer to ensure optimal coverage. The optimal speed 860 can be a static value, user selected value, or a dynamically calculated value based on the sprayer profile 600, the paint profile 700, the air pressure 880, and the relative trigger position. The optimal speed 860 can be dynamically calculated based on the instantaneous flow rate such that the optimal speed 860 is greater when the flow rate is higher and the optimal speed 860 is lower when the flow rate is lower.

The paint volume 890 can represent the amount of paint in a reservoir of the virtual paint sprayer. In embodiments of the invention, the head mounted display unit includes a transparent paint canister and a level of paint in the paint canister decreases as paint is used.

Figure 5:
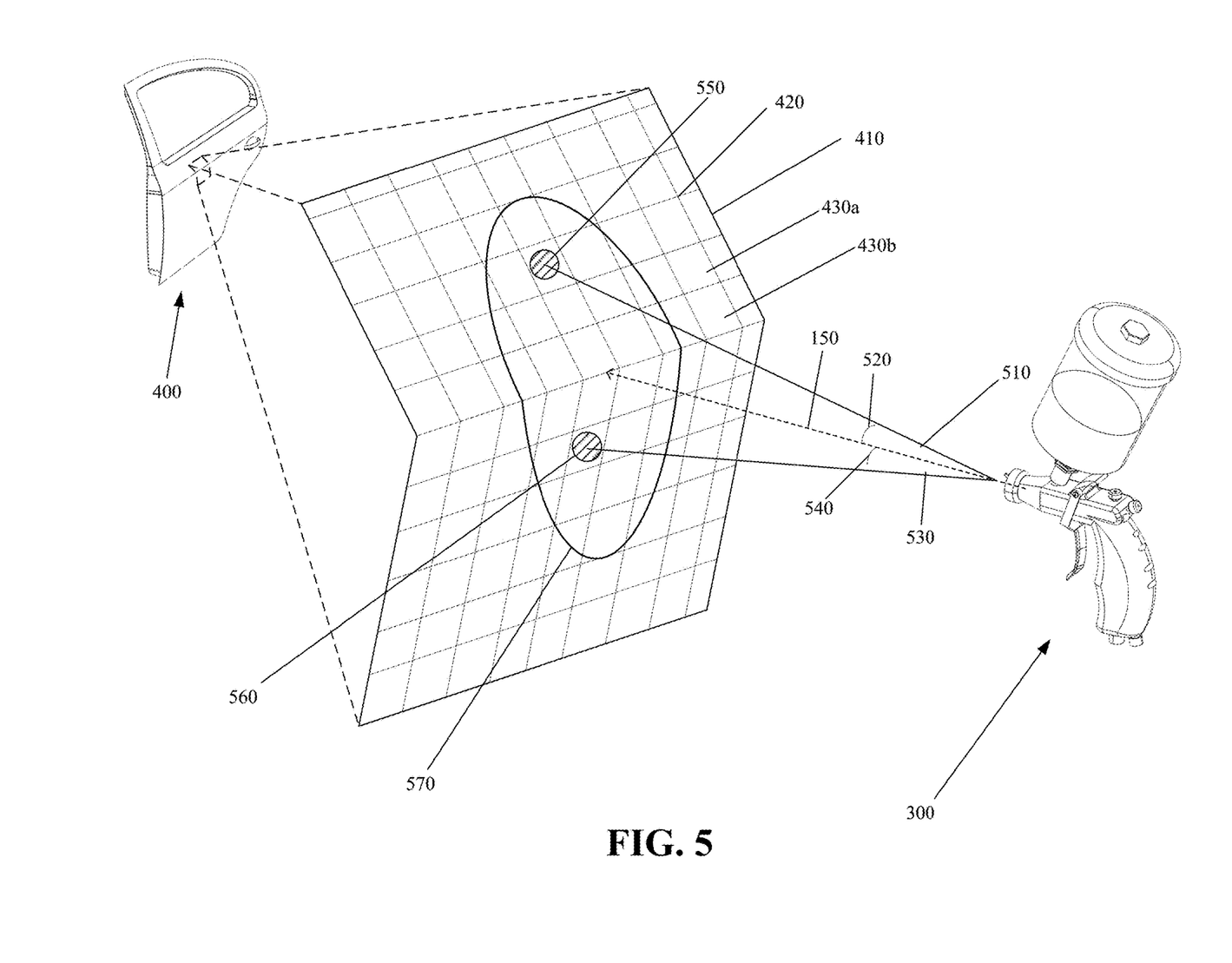
FIG. 5 is a diagram illustrating the accumulation of paint on a virtual surface according to an exemplary embodiment of the invention.

FIG. 5 is a diagram illustrating the accumulation of paint on a virtual surface according to an exemplary embodiment of the invention. As shown in FIG. 5, a virtual paint sprayer 300 can simulate the accumulation of virtual paint on a virtual work 400. As shown in inset 410, the surface of the virtual work 400 can be logically divided into a mesh 420 having a plurality of sections, such as 430a and 430b.

The virtual paint sprayer 300 can have an aiming direction 150 that intersects the virtual work 400. A paint dispersion pattern consistent with the dispersion pattern 630 of the sprayer profile 600 can be calculated on the virtual work 400. It is noted that in the illustrative example of FIG. 5 the aiming direction 150 intersects the virtual work 400 at a body line—that is the surface of the virtual work is non-planar at the intersection point. In preferred embodiments of the invention, calculating the dispersion pattern on a virtual surface includes projecting the dispersion pattern on the virtual surface. As shown in the example of FIG. 5, this can result in a non-planar dispersion pattern that is bent or partially folded around the body line.

The accumulation of paint is simulated by projecting droplets 560 and 550 from the front of the paint sprayer 300 onto the virtual work 400. The exact location of the droplets can be determined by calculating a vector (e.g. 530 and 510) from the front of the paint sprayer to the virtual work 400. The vectors can be calculated by selecting an offset angle (e.g. 520 and 540) from the aiming direction vector 150 such that the vectors 530 and 510 intersect the virtual work 400 inside the dispersion pattern 570. The offset angles 520 and 540 can include an x offset and a y offset or, alternatively, an offset angle and rotation with respect to the aiming direction. The offset angles and/or rotations can be determined randomly and limited to resulting vectors that intersect the virtual work 400 inside the projected dispersion pattern 570.

In embodiments of the invention, the virtual paint sprayer emits 2000 droplets per frame. In other embodiments of the invention the virtual paint sprayer can emit 4000-6000 droplets per frame. In use, the mock paint sprayer can be moved by an operator to simulate a sweeping motion of spraying paint. Due to limitations in the sampling rate of the motion tracking system, the sweeping of the mock paint sprayer can occur too fast with respect to the sampling rate such that the resulting dispersion pattern appears fragmented and non-uniform. To minimize the effect of fragmentation, embodiments of the invention can interpolate a path of the mock paint sprayer between sampling points of the motion tracking system and uniformly distribute the droplets per frame across the path. That is, rather than emitting the entirety of the droplets per frame at each sampling point of the motion tracking system, the number of droplets can be emitted gradually over the interpolated path of the paint sprayer between sampling points of the motion tracking system.

The invention can calculate a vector for each of these droplets and calculate the intersection of the droplet with the virtual work 400. As a specific example, vector 510 can be calculated by selecting an x/y angle offset 520 from the aiming line 150. A virtual droplet 550 can be determined to have "landed" on the virtual work 400 at the intersection point of vector 510 with virtual work 400. In embodiments of the invention, a droplet has a radius and a volume which can be used to calculate the thickness. Each droplet can be stored and accumulated in the mesh 420. In another example, vector 530 can be calculated by selecting an x/y angle offset 540 from the aiming line 150. A virtual droplet 560 can be determined to have "landed" on the virtual work 400 at the intersection point of vector 530 with virtual work 400.

The thickness of a droplet can be calculated from the paint flow which is a factor of trigger pull on the mock paint sprayer. For example, if the paint sprayer is emitting paint at 3.7 L/Min by emitting 5000 droplets per frame at 90 frames per second, each droplet can have a calculated volume of 0.137 µl (3.7/60 s/5000 drops/90 f/s*1,000,000 µl/L). A droplet can have a predetermined radius provided in the simulation profile (e.g. FIG. 4, element 815) and, together with the volume, the thickness of the droplet can be determined through ordinary geometry. In the example of droplet 550, and assuming a circular droplet having a 1 cm radius, the droplet 550 can cover an area of $\pi r^2$ or $\pi*1$ cm$^2$ for a total area of ~3.141592 cm$^2$ or 314.1592 mm$^2$. A 0.137 µl droplet would fill 314.1592 mm$^2$ to a depth of 0.000436085 mm.

Each section of the mesh 420 can store information regarding the accumulated thickness of paint on the virtual work 400 for that section. Although the mesh 420 is illustrated as a series of squares overlaying the virtual work 400, it should be appreciated that the mesh 420 as illustrated in FIG. 5 is a visual representation of a data structure corresponding with the virtual work 400. Other shapes and densities of meshes are contemplated including congruent and incongruent triangles and hexagons. The mesh 420 data structure can be a 3D array that corresponds to the shape of the virtual work 400 and can be used to store information relating to the accumulation of virtual paint on the virtual work 400.

Each time a droplet "lands" on a section, the droplet can be stored in the mesh 420. A droplet radius of 1 cm can produce simulated droplets that are larger than what would be expected in real world droplets. The simulation can benefit from efficiencies by the creation of fewer data points to calculate, track, and store in the mesh 420. The total accumulation of paint on the virtual work 400 at any point can be determined by summing the thickness of each of the virtual droplets that cover that point. Evaluation of paint coverage on the virtual work can be determined by calculating an average paint thickness for a particular region of the virtual work 400. The accumulated thickness value can be compared against an optimal thickness value of the simulation profile to determine how well a user applied paint to the virtual work 400. Accumulated thickness can be displayed as a heat map on the surface of the virtual work 400 where cooler colors represent thin paint, warmer colors represent thick paint, and neutral colors represent optimal thickness paint. In this way, a user of the invention can have feedback on the effectiveness of the user's technique.

Although virtual paint droplets of the present invention have been described as substantially round and having a radius, it is contemplated that virtual paint droplets can become oblong or oval as the mock paint sprayer is tilted with respect to the virtual work. Embodiments of the invention can project a circular droplet onto surface that is not perpendicular with respect to the paint sprayer yielding and oblong or oval droplet.

The vector method described herein of calculating the accumulation of paint is an improvement over the prior art. In the related art, the paint was assumed to accumulate randomly within an "inner ellipse" which was always planar projection on the virtual work. In the present invention, the nozzle type can determine a dispersion pattern which can be projected on the virtual work and could be "draped" over the virtual work according to the shape and contour of the virtual work. This improvement is important because it recognizes and gives effect to the fact that parts of the dispersion pattern are farther away from the nozzle than others.

In an illustrative example of the improvements of the invention over the related art, consider a simple planar ellipse on a flat surface. Naturally, the edges of the ellipse are farther away from the nozzle of the paint sprayer than the center of the ellipse. In the real world, paint at the edges of the ellipse would be slightly more diffuse than the center because some of the drops would travel farther and have more time to spread out. The related art attempted to account for this using a crude approximation having both an inner ellipse with full coverage and outer ellipse where coverage decrease linearly. The present invention simplifies this model while providing better coverage modeling because a vector and intersection point is calculated for every drop of paint. While the related art crudely estimated paint dispersion through two ellipses, the present invention more closely simulates paint dispersion with vectors. By modeling paint spray (i.e. where each droplet is going), the present invention avoids the crude approximations of the related art. Moreover, because a vector is calculated for each droplet, the present invention more accurately simulates the accumulation of paint on an uneven surface.

For example, when painting a ball with a real paint sprayer, and aiming the sprayer at the center of the ball, the poles of the ball would naturally receive much less coverage because they are farther away from the paint source and because the surface slopes away from the paint sprayer. The present invention accounts for this by calculating a vector for each drop of paint and "accumulating" the virtual paint in the mesh. As the curvature of the ball slopes away from the paint sprayer, the calculated vectors between the paint sprayer and the ball become longer and intersect more distant parts of the virtual work. Under the present invention, paint is accumulated in the mesh and the coverage is inherently thinner as the ball slopes away. In contrast, in the related art, uniform coverage is assumed within the "inner ellipse" resulting in a fully painted ball. Thus, the present invention also improves upon the related art by more accurately modeling paint coverage on non-planar surfaces. This is an important aspect of modeling when simulating painting—particularly when painting oddly-shaped surfaces such as the nook around the door handle of a car door.

Embodiments of the invention contemplate visual indicators that can be displayed on the head-mounted display to assist a user in learning the proper technique for using a paint sprayer. For example, to achieve a uniform application of paint, it is important to hold the paint sprayer at an optimal distance, sweep the paint sprayer at an optimal speed, hold the paint sprayer approximately square to the work, and ensure an optimal flow of paint. Each of these optimal techniques can take years for a journeyman to perfect. As will be discussed in greater detail in conjunction with FIG. 6A-FIG. 9B, embodiments of the invention can display indicators to prompt a user to correct their technique. The indicators can be dynamic or changing in that they can change colors or grow to indicate the degree of correction necessary. For example, an arrow can grow larger or longer to indicate that the paint sprayer needs to move farther in the direction of the arrow.

Figure 6A:
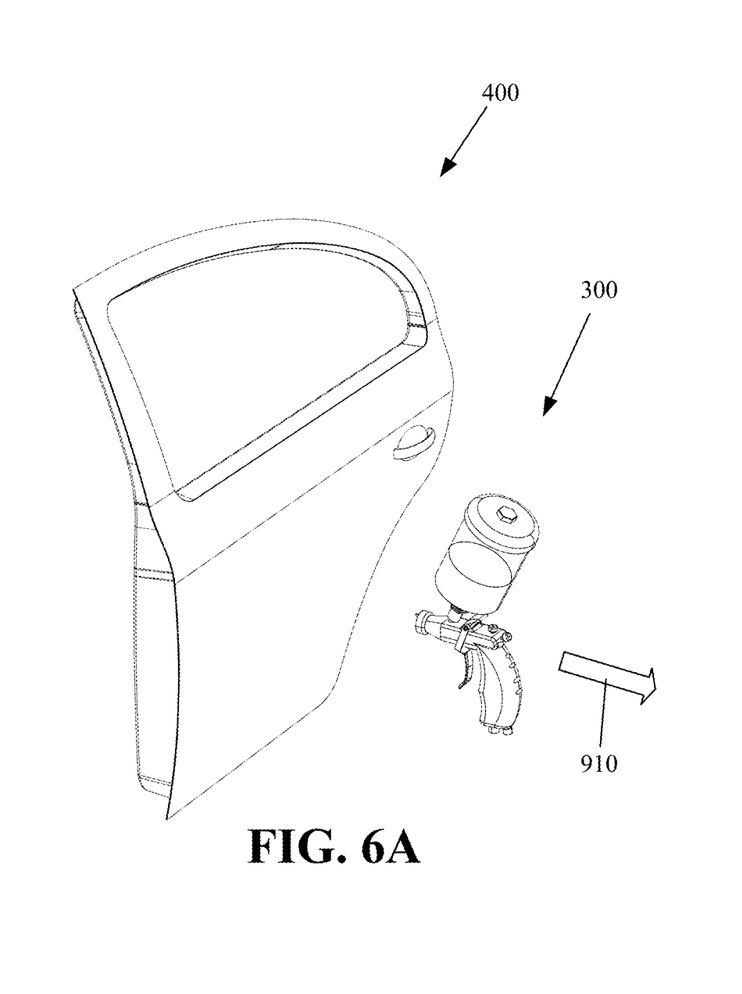
FIGS. 6A and 6B are illustrations of exemplary on-screen training aids in virtual environments according to exemplary embodiments of the invention.
Figure 6B:
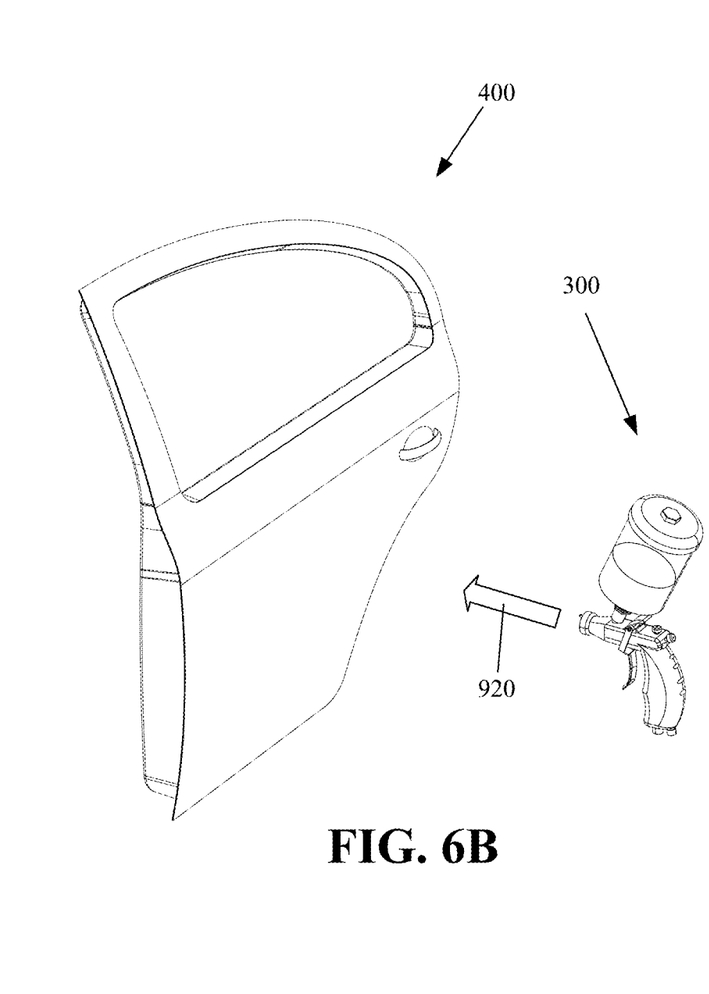

FIGS. 6A and 6B are illustrations of exemplary on-screen training aids in virtual environments according to exemplary embodiments of the invention. FIG. 6A can represent a virtual environment where a user is holding the paint sprayer 300 too close to the virtual work 400. When the paint sprayer 300 is too close accumulated paint can drip or run. The optimal distance can be specified in the paint profile 700 of FIG. 4. An operator or a teacher can set the optimal distance in the simulation profile according to best practices or characteristics of the paint. The simulation profile can also include a threshold distance which can represent a reasonable margin of error or deviation from the optimal distance. In the embodiment of FIG. 6A, an arrow 910 can be displayed to indicate that the virtual paint sprayer 300 is too close to the virtual work 400. The arrow 910 can point away from the virtual work to indicate the direction that the virtual paint sprayer 300 should be moved.

The arrow 910 can be displayed when the virtual paint sprayer is less than the optimal distance from the work by a margin greater than the threshold distance. For example, if the optimal distance is 22 cm and the threshold distance is 4 cm, the arrow 910 can be displayed when the distance between the paint sprayer and the work is less than 18 cm. The arrow 910 can grow as the distance between the paint sprayer and the work decreases to indicate that a greater degree of correction is required. For example, the arrow 910 can be longer when the distance is 12 cm and shorter when the distance is 16 cm. Alternatively, the arrow can become wider/narrower, have a larger/smaller head, or change colors to indicate the degree of correction necessary. Although the arrow is illustrated in FIG. 6A as appearing behind the paint sprayer 600, it is contemplated that the arrow could appear in other locations in the virtual environment so as to intuitively indicate the correction necessary, minimize visual interference, and comport with user preference.

FIG. 6B is an illustration of a virtual environment in which the paint sprayer 300 is too far from the virtual work 400 and an arrow 920 is displayed to indicate the direction in which the sprayer should be moved. The arrow 920 can appear when the when the paint sprayer 300 is greater than the optimal distance and the threshold from the virtual work 400. For example, where the optimal distance is 22 cm and the threshold distance is 4 cm the arrow 920 can appear when the paint sprayer is greater than 26 cm from the virtual work. The distance between the paint sprayer 300 and the virtual work 400 can be measured between the front of the paint sprayer 300 and the closest spot on the virtual work 400. Alternatively, distance between the paint sprayer 300 and the virtual work 400 can be measured between the front of the paint sprayer 300 and the aiming point of the paint sprayer 300 on virtual work 400.

Figure 7A:
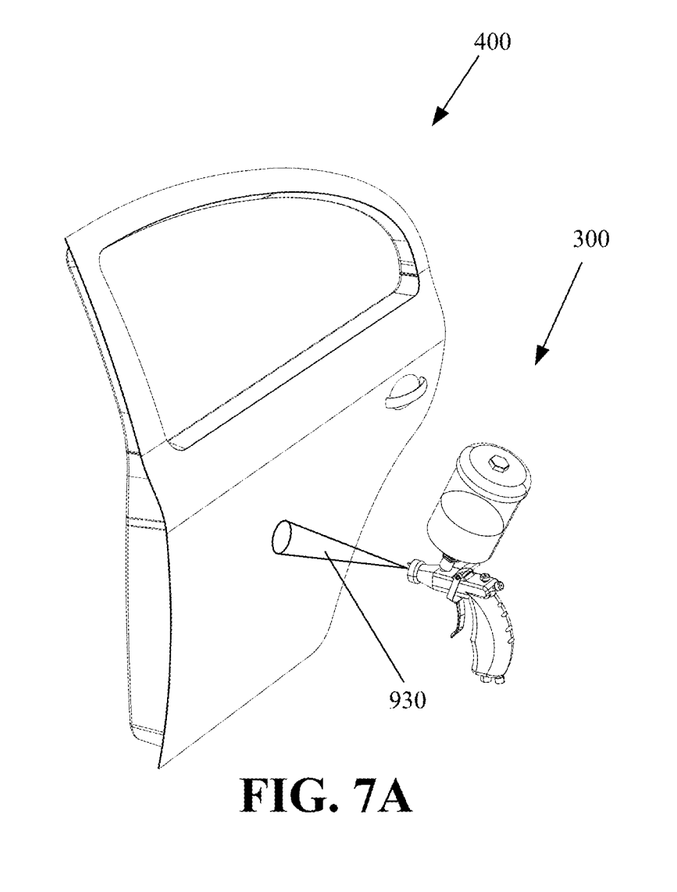
FIGS. 7A and 7B are illustrations of exemplary on-screen training aids in virtual environments according to exemplary embodiments of the invention
Figure 7B:
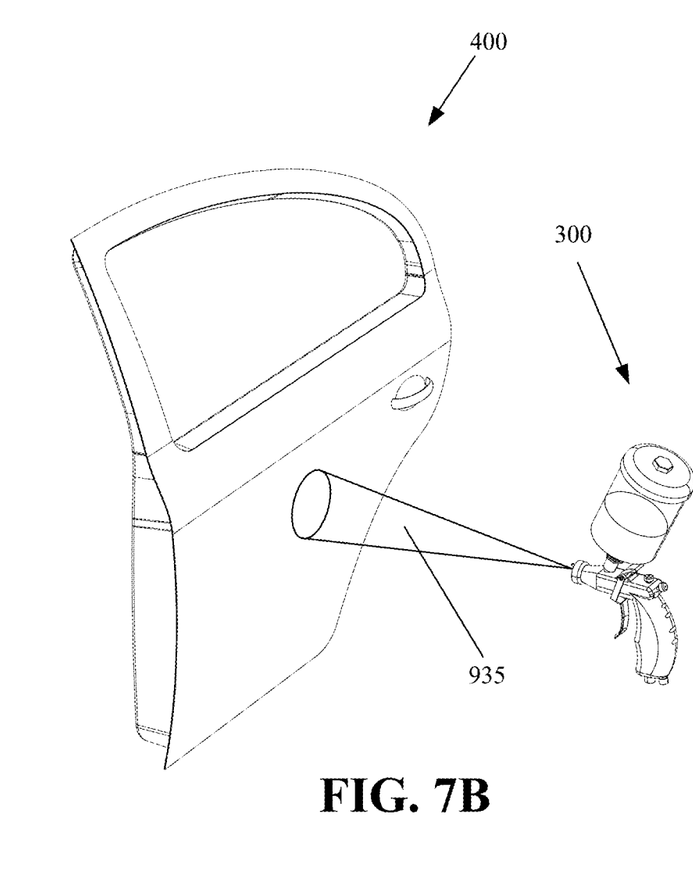

FIGS. 7A and 7B are illustrations of exemplary on-screen training aids in virtual environments according to exemplary embodiments of the invention. As shown in FIGS. 7A and 7B a virtual environment can include a virtual paint sprayer 300 and a virtual work 400. When a user pulls the trigger of a mock paint sprayer (e.g. the mock paint sprayer of FIG. 2), the invention can render virtual spray 930 and 935 emerging from the front of the virtual paint sprayer 300. The color and color intensity of the virtual spray 930 and 935 can change based on the distance between the virtual paint sprayer 300 and the virtual work 400 to indicate the virtual paint sprayer 300 is too close or too far from the virtual work 400. At the optimal distance and within the threshold distance, the virtual spray can be shown as green. Outside of the threshold distance, the virtual spray can fade or transition into another color.

In the example of FIG. 7A, the paint sprayer 300 is too close and the virtual spray can be shown as red. As the distance decreases, the virtual spray 930 can become a darker or deeper red. In the example of FIG. 7B, the paint sprayer 300 is too far and the virtual spray can be shown as blue. As the distance increases, the virtual spray 930 can become a darker or deeper blue.

Figure 8A:
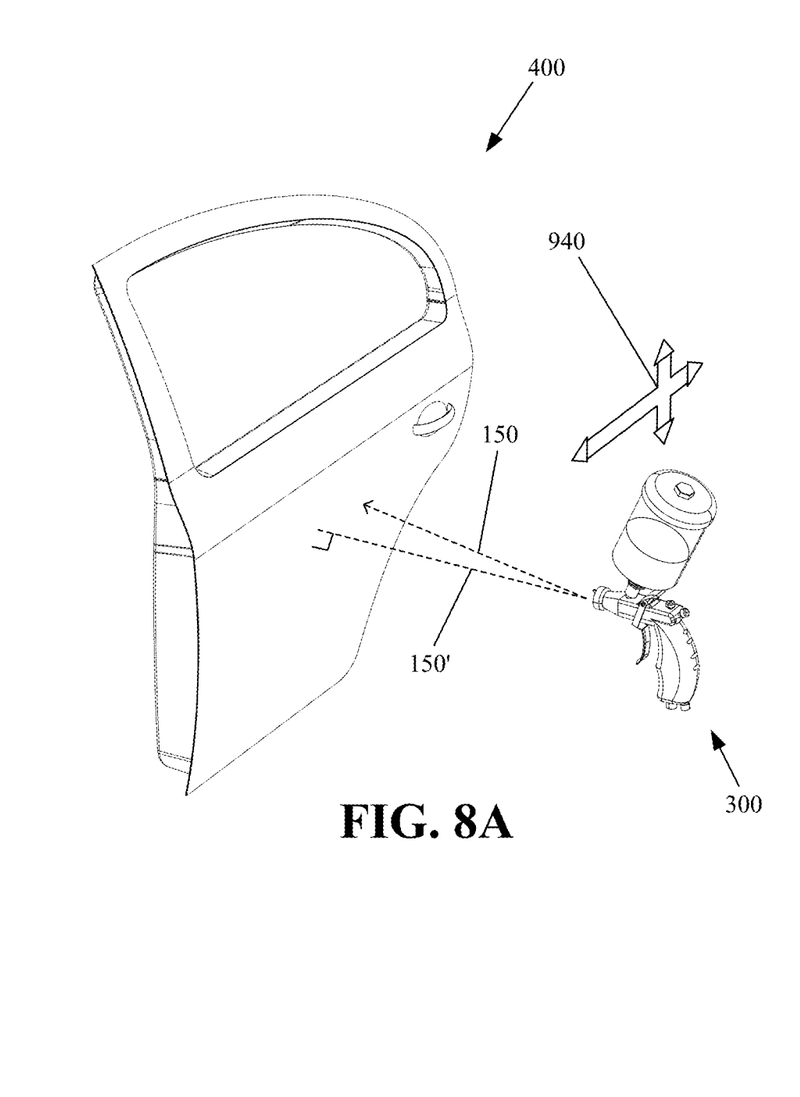
FIGS. 8A and 8B are illustrations of exemplary on-screen training aids in virtual environments according to exemplary embodiments of the invention.
Figure 8B:
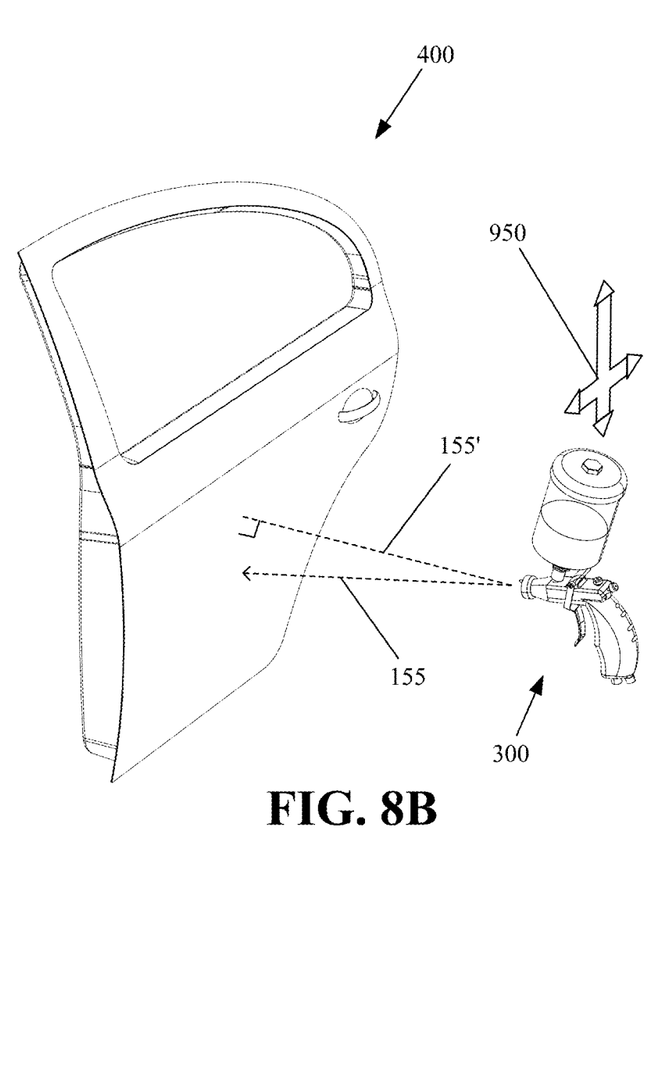

FIGS. 8A and 8B are illustrations of exemplary on-screen training aids in virtual environments according to exemplary embodiments of the invention. As shown in FIGS. 8A and 8B, a pitch-yaw indicator 940 and 950 can be displayed to correct for pitch and yaw. Optimal and uniform paint coverage can be achieved when the paint sprayer is approximately square to the work. When the paint sprayer is tilted, the generally elliptical dispersion pattern can be skewed or stretch resulting in uneven coverage. Thus, training a user to maintain a stable pitch and yaw is desireable. A pitch-yaw indicator, generally, can have four arrows of equal length in the arrangement of a plus sign (e.g. +). The arrows can change to indicate the direction and the degree of correction needed In FIGS. 8A and 8B, the reference lines 150' and 155' can represent normal lines from the virtual work 400 to the virtual paint sprayer 300. The reference lines 150 and 155 can represent the aiming direction of the virtual paint sprayer 300. As shown in FIGS. 8A and 8B, the aiming directions 150 and 155 are different from the normal lines 150' and 155', respectively. This can represent that the paint sprayer 300 is tilted with respect to the virtual work 400.

In the example of FIG. 8A, the paint sprayer 300 is tilted slightly to the right of the normal line 150'. A visual indicator 940 can be a pitch-yaw indicator and indicate the degree of tilt and the required correction. Here, the left arrow of the pitch-yaw indicator is longer to indicate that the paint sprayer should be tilted in that direction. The left arrow can grow or change colors to indicate a greater degree of correction is required.

In the example of FIG. 8B, the paint sprayer 300 is tilted slightly lower than the normal line 155'. A visual indicator 950 can be a pitch-yaw indicator and indicate the degree of tilt and the required correction. Here, the top arrow of the pitch-yaw indicator is longer to indicate that the paint sprayer should be tilted in that direction. The top arrow can grow or change colors to indicate a greater degree of correction is required.

The as with the distance indicators discussed in conjunction with FIGS. 6A and 6B, the pitch-yaw indicators can be responsive to a threshold. For example, the pitch-yaw indicators can be displayed only when the pitch or yaw of the paint sprayer exceeds a threshold tilt from the normal line such as 3 degrees or 5 degrees.

Figure 9A:
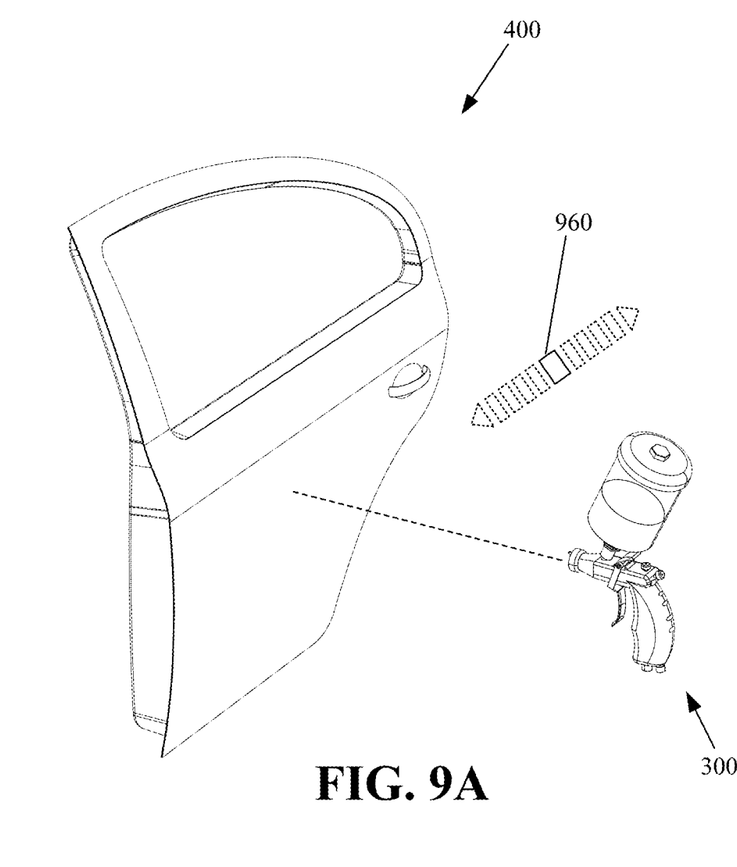
FIGS. 9A and 9B are illustrations of exemplary on-screen training aids in virtual environments according to exemplary embodiments of the invention.
Figure 9B:
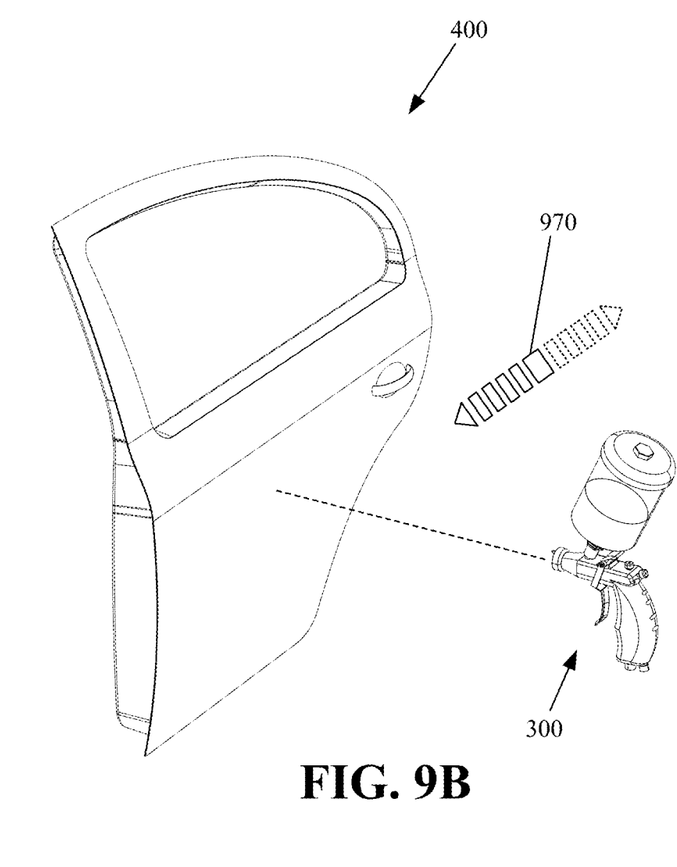

FIGS. 9A and 9B are illustrations of exemplary on-screen training aids in virtual environments according to exemplary embodiments of the invention. The on-screen training aids of FIGS. 9A and 9B can be speed indicators to instruct a user in the optimal speed. Spray painting, generally, is performed by sweeping a paint sprayer across an item to be painted. If the sweep is too fast the paint can be too thin. If the sweep is too slow the paint can be too thick and have runs or drips.

In FIGS. 9A and 9B a speed indicator 960 and 970 is illustrated as a bi-directional segmented arrow. In FIG. 9A, the speed indicator 960 has a central portion in solid line and the segmented portions in broken line. This can indicate that the current speed is optimal. In FIG. 9B, the speed indicator 970 has the left segments in solid line and the right segments in broken line. This can indicate that the speed needs to be adjusted in the direction of the solid-line arrows.

In the example of FIG. 9B, assuming a user was sweeping the paint sprayer 300 from right to left, the speed indicator 970 can indicate that the speed needs to be changed in the direction of the solid-line arrow. Because the user is sweeping from right to left, the indicator 970 pointing left can mean that the user should increase the speed. In contrast, assuming the user was sweeping the paint sprayer 300 from left to right, the speed indicator 970 can indicate that the speed needs to be changed in the direction of the solid-line arrow. Because the user is sweeping from left to right, the indicator 970 pointing left can mean that the user should decrease the speed.

The speed indicators 960 and 970 are illustrated as segmented and it is contemplated that the number of "indicated" segments can indicate the degree of speed change necessary. For example, where only one segment is indicated the speed only needs to change slightly and where many segments are indicated the speed needs to change more. A segment can be "indicated" when it is turned on its visual profile is increased. For example, the entire speed indicator except for the central portion may be 90% transparent at the optimal speed. As the actual speed changes with respect to the optimal speed, the transparency of the segments can be toggled to indicate a speed change is necessary. As with the distance indicator discussed in conjunction with FIGS. 6A and 6B, the speed indicator can be responsive to a threshold such that the speed indicator does not indicate a correction is necessary unless the speed deviates from the optimal speed by more than a threshold amount. The optimal speed and the threshold speed can be included in a simulation profile.

It will be apparent to those skilled in the art that various modifications and variations can be made in the spray paint simulator and training aid without departing from the spirit or scope of the invention. Thus, it is intended that embodiments of the invention cover the modifications and variations of this invention provided they come within the scope of the appended claims and their equivalents.

What is claimed is:

1. A method for simulating an accumulation of paint on a virtual object, the method comprising:
    dividing a surface of the virtual object into a plurality of sections;
    determining a point on the virtual object to deposit a virtual paint droplet based on a position of a mock paint sprayer;
    depositing the virtual paint droplet on the virtual object so that a center of the virtual paint droplet is disposed at the point;
    determining a subset of the plurality of sections touching the virtual paint droplet;
    calculating a volume for the virtual paint droplet;
    calculating a thickness for the virtual paint droplet based on the volume and a radius of the virtual paint droplet;
    incrementing a thickness variable for each section of the subset of the plurality of sections by the calculated thickness of the virtual paint droplet; and
    displaying on a display device the accumulation of paint on the virtual object consistent with the thickness variable for each of the plurality of sections.

2. The method of claim 1 wherein the point on the virtual object to deposit the virtual paint droplet is the intersection point of a vector from a virtual paint sprayer with the virtual object.

3. The method of claim 1 wherein the volume of the virtual paint droplet is determined by calculating a paint flow rate from a virtual paint sprayer, dividing the paint flow rate by a refresh rate to yield a frame flow rate, and dividing the frame flow rate by a predetermined droplets-per-frame value.

4. The method of claim 1 wherein the radius of the virtual paint droplet is predetermined in a simulation profile.

5. The method of claim 4 wherein the virtual paint droplet is assumed to be a cylinder.

6. A method for simulating an accumulation of paint emitted by a virtual paint sprayer on a surface of a virtual object, the method comprising:
    calculating a position of the virtual paint sprayer based on a position of a mock paint sprayer;
    calculating a plurality of vectors emanating from the virtual paint sprayer;
    calculating a respective intersection point for each of the plurality of vectors with the virtual object;
    depositing a respective center of a virtual paint droplet at each of the respective intersection points;
    dividing the surface of the virtual object into a plurality of sections;
    identifying, for each of the deposited virtual paint droplets, at least one section of the plurality of sections touched by such virtual paint droplet;
    calculating a volume of a virtual paint droplet emitted by the virtual paint sprayer;
    calculating a calculated thickness for each of the deposited virtual paint droplets assuming each virtual paint droplet has a same radius;
    incrementing a thickness variable for each of the at least one section of the plurality of sections by the calculated thickness; and
    displaying on a display device the accumulation of paint on the virtual object consistent with the thickness variable for each of the plurality of sections.

7. The method of claim 6 wherein the thickness for a virtual paint droplet is calculated in accordance with the volume and the same radius of the virtual paint droplet.

8. The method of claim 7 wherein the volume is determined by calculating a paint flow rate from the virtual paint sprayer, dividing the paint flow rate by a refresh rate to yield a frame flow rate, and dividing the frame flow rate by a predetermined droplets-per-frame value.

9. The method of claim 6 wherein each of the virtual paint droplets is assumed to be a cylinder and the calculated thickness is calculated in accordance with the volume and the same radius of the virtual paint droplet.

10. An instructional aid for training an operator to use a paint sprayer, the instructional aid comprising:
    a mock paint sprayer sized in relative proportions to be hand-held by the operator;
    a virtual object; a virtual paint sprayer corresponding to the mock paint sprayer, the virtual paint sprayer configured to virtually emit virtual paint droplets;
    a mesh data structure having a plurality of sections, each section representing a corresponding section of a surface of the virtual object;
    a plurality of virtual paint droplets virtually deposited on the surface of the virtual object by the virtual paint sprayer, each of the plurality of virtual paint droplets touching one or more of the plurality of sections, each virtual paint droplet having a volume and a calculated thickness assuming each virtual paint droplet has a same radius;
    wherein a thickness variable for each of the one or more of the plurality of sections is incremented by the calculated thickness for the corresponding virtual paint droplet; and
    a display device for displaying an accumulation of paint on the virtual object consistent with the thickness variable for each of the plurality of sections.

11. The instructional aid of claim 10 wherein each of the plurality of virtual paint droplets is associated with one of a plurality of vectors, each of said plurality of vectors intersecting the virtual object at a respective intersection point, and a center of each of the plurality of virtual paint droplets is virtually disposed at the respective intersection point.

12. The instructional aid of claim 10 wherein the thickness for one of the plurality of virtual paint droplets is calculated in accordance with a volume and the same radius.

13. The instructional aid of claim 12 wherein the volume is determined by calculating a paint flow rate from the virtual paint sprayer, dividing the paint flow rate by a refresh rate to yield a frame flow rate, and dividing the frame flow rate by a predetermined droplets-per-frame value.

14. The instructional aid of claim 10 wherein each of the plurality of virtual paint droplets is assumed to be a cylinder and the thickness is calculated in accordance with a volume and the same radius of the virtual paint droplet.

* * * * *